United States Patent [19]

Kafka et al.

[11] Patent Number: 5,129,181

[45] Date of Patent: * Jul. 14, 1992

[54] SUBSTRATE FOR OUT-OF-GROUND CULTIVATION

[75] Inventors: Bernard Kafka, Rantigny; Marie-Agnes Robert, La Garenne Colombes, both of France

[73] Assignee: Isover Saint-Gobain, Courbevoie, France

[ * ] Notice: The portion of the term of this patent subsequent to Oct. 29, 2008 has been disclaimed.

[21] Appl. No.: 497,133

[22] Filed: Mar. 21, 1990

[30] Foreign Application Priority Data

Mar. 21, 1989 [FR] France ............................ 89 03652

[51] Int. Cl.$^5$ .............................................. A01G 9/02
[52] U.S. Cl. ............................................ 47/64; 47/81
[58] Field of Search .................. 47/64, 81, 60, 61, 62, 47/63

[56] References Cited

U.S. PATENT DOCUMENTS 4,058,931 11/1977 Vestergaard ........................ 47/64

FOREIGN PATENT DOCUMENTS 62-220128 9/1987 Japan ................................ 47/81

Primary Examiner—David A. Scherbel
Assistant Examiner—Joanne C. Downs
Attorney, Agent, or Firm—Oblon, Spivak, McClelland, Maier & Neustadt

[57] ABSTRACT

Disclosed is a substrate for out-of-ground cultivation by using a substrate consisting of mineral fibers. The substrate according to the invention is of limited dimensions and is used for the cultivation phase corresponding to the development of seedlings. This substrate, being of generally parallelepipedic shape, exhibits on its lower face added feet or pedestals that project therefrom and isolate the substrate from the ground on which its rests. The substrate according to the invention makes it possible to improve cultivation conditions.

7 Claims, 2 Drawing Sheets

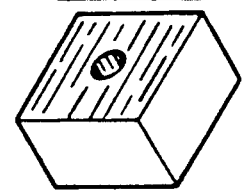
FIG_1
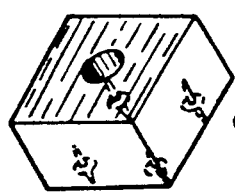
FIG_2a
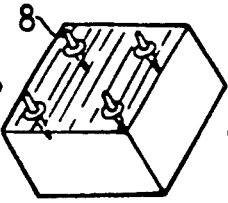
FIG_2b
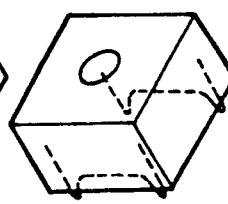
FIG_3a
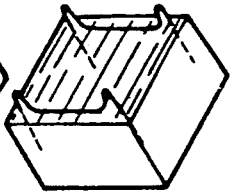
FIG_3b
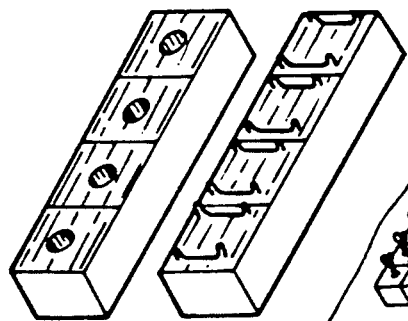
FIG_4a  FIG_4b
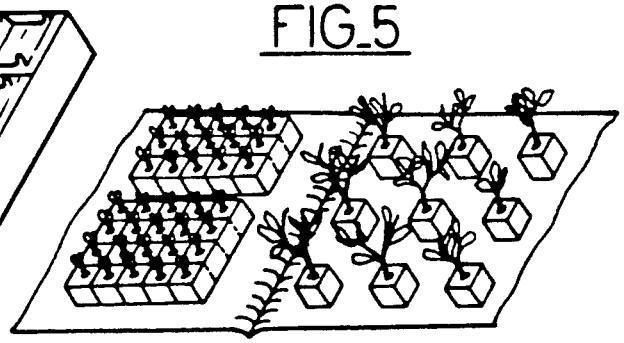
FIG_5
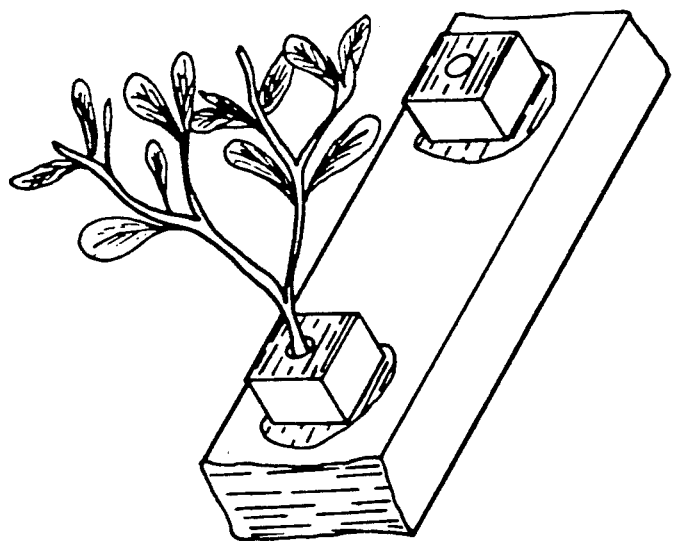
FIG_6

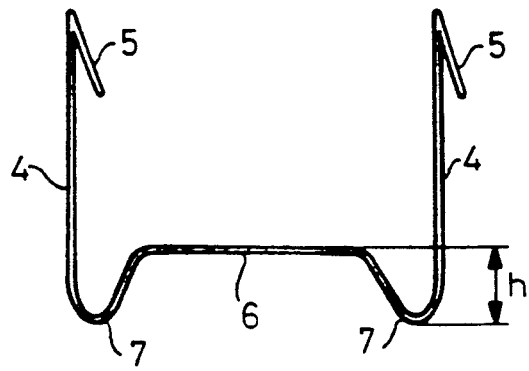
FIG_2c
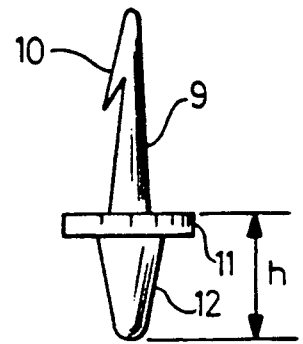
FIG_3c
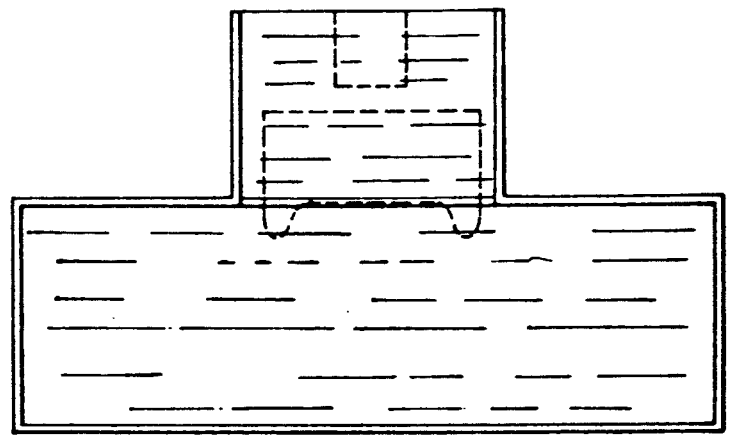
FIG_7

SUBSTRATE FOR OUT-OF-GROUND CULTIVATION

BACKGROUND OF THE INVENTION

1. Field of the Invention

The invention relates to out-of-ground cultivation techniques. More specifically, the invention relates to techniques in which the cultivation involves several successive stages of growth of seedlings, each stage leading to the use of a substrate offering a volume greater than that of the preceding one to make satisfactory development of the root system of the seedling possible.

2. Discussion of the Background

In intensive methods of out-of-ground cultivation, good management of materials and available space has lead to a series of stages being used corresponding to the use of specific substrates.

The most widely used method at the present time in out-of-ground cultivations in a greenhouse uses at least two successive stages. The first stage corresponds to the initial growth of the seedlings. Since the seedlings are not very bulky and exhibit a limited development of their root system, the professional at this stage preferably uses a substrate of limited volume. This makes it possible to multiply the number of seedlings cultivated in a limited space. It also makes it possible to minimize the volume of the nutritive solution necessary to maintain the substrate under conditions suitable for the development of the seedlings. In a second stage, the seedlings which have grown on these limited-volume substrates are placed, with the first substrate, on a second substrate offering a larger volume, and which are ordinarily spaced from one another.

SUMMARY OF THE INVENTION

The invention relates to mineral substrates on which seedlings are grown that require only a limited volume whose order of magnitude is 1 $dm^3$. More specifically, the invention relates to substrates made of mineral fibers such as glass wool or mineral wool.

The substrates considered according to the present invention have a general parallelepipedic shape. This shape is one which, from the standpoint of producers as users, is notably the most practical. The transport of these substrates, by avoiding any lost volume, is improved by the use of this shape. Their production is also greatly facilitated by this shape and this shape lends itself to advanced automation. These advantages are very considerable for products that must necessarily be offered at very low prices. For the user, the parallelepipedic shape makes possible convenient groupings, on a small surface, of these elements in the stages of cultivation where, since the seedlings are not very developed, it is advantageous to minimize the occupied surface.

For convenience of the disclosure, we will refer to these substrate elements below as "cubes," it being understood that they do not necessarily, not even generally, exhibit a truly cubic shape. This name, nevertheless, is selected because it corresponds to the one which is ordinarily adopted by users.

To understand well the problem that the invention proposes to solve, it is necessary to more greatly detail the usual method of using these "cubes."

In intensive cultivation methods which represent the most significant prospects for this type of product, the "cubes" are in a first step placed against one another on a wide surface. In this type of arrangement, it is necessary to provide both satisfactory irrigation and suitable aeration to assure the most complete and rapid growth of the seedlings. Irrigation can be performed either through the upper portion of the cubes, or by their base, i.e., the portion resting on the ground. In practice, the two methods can be combined. Often the cubes are placed in a unit which forms a sort of tank able to receive the irrigation solution to partially immerse the cubes. The solution rises to sufficient level relative to the height of the cubes to that the latter are entirely soaked. For cubes about ten centimeters in height, the temporary level of the irrigation solution reaches, for example, a third of the height of the cube. The solution then rises in the substrate by capillary action. After irrigation having been performed, the irrigation solution is evacuated and recovered for later use. This type of irrigation operation is repeated according to a cycle that is dependent both on the cultivation considered and on the ambient conditions (season, temperature, evaporation . . .). After a certain development of the seedlings has occurred, it is normal to separate the cubes from one another to offer more space and light. At this stage still, the irrigation is advantageously performed as indicated above by a method that is referred to as "subirrigation."

In these stages of the cultivation on cubes, we have seen how the irrigation could be performed. We have also noted that it was necessary to assure good aeration of the roots between successive irrigations. This aeration is a condition necessary for good development. The standard cubes used exhibit a plane base resting entirely on the ground or, more accurately, on the bottom of the tank or else on a covering, most often a waterproof film covering the ground and isolating the cubes from it. In all these applications, a problem arises. The lower face of the cubes tends, on contact with the support on which it rests, to maintain a liquid film after the irrigation has ceased. In other words, when the irrigation solution is evacuated, whether it was introduced by subirrigation or by irrigation through the upper face of the cubes, the contact between the cube and its support maintains, by what can be called a surface effect, a continuous liquid film which is opposed to the normal drainage of the cube under the effect of gravity. Under these conditions, water retention is substantially prolonged, jeopardizing the establishment of the most favorable air/water ratio.

To reestablish fast draining of the solution after each irrigation operation, a technique developed by the users has been to place under the cubes a porous material or grates which by breaking the contact between the cubes and their support eliminates this surface effect. These means, however, have the drawback of complicating maintenance of the cultivation areas. In particular, they must be sterilized between each new cultivation. Another solution used has consisted of making grooves on the lower face of the cubes. These grooves, which are on the order of 1 to 2 centimeters in depth and in width, break up the film in a way which improves the drainage and, consequently, the aeration of the cubes. These grooves make it possible to reduce the contact surface by about a third and then return to a suitable air/water balance within a notably shortened period after each irrigation. However, a still very sizable surface remains at the base of the cube in contact with the support and, even when reduced, the underlying liquid film remains present at these contact points.

Further, the use of the grooves at the base of the cubes makes it impossible for contact to be complete in the final phase when these cubes are placed in cultivation slabs. At the site of the grooves, contact cannot occur, which makes the passage of the roots from the cube to the slab more difficult.

The present invention is proposed so as to proved "cube" type substrates for the cultivation of seedlings, of parallelepipedic shape and whose face, in the cultivation phase on the cube, is isolated form the support on which it is place, and in the cultivation phase on a cube and slab, is in complete contact with the corresponding part of the slab.

To obtain this dual effect, there are placed on the lower face of each cube added feet which include at least a tapered part which is sunk into the mass of fibers, a stop means along the tapered part limiting its penetration into the mass of fibers, and apart forming the foot itself which projects on the lower face, making it possible to isolate the cube from its support.

BRIEF DESCRIPTION OF THE DRAWINGS

The invention is described, in a more detailed manner, in the following description by making reference to the sheets of drawings in which:

FIG. 1 represents a substrate in a traditional cube shape,

FIGS. 2a and 2b show, in a perspective view from above and from below, respectively, a substrate according to the invention, FIG. 2c shows, in an enlargement, the type of foot used in cubes 2a and 2b, FIGS. 3a and 3b show, in a perspective view from above and from below, respectively, another embodiment according to the invention, FIG. 3c shows, in an enlargement, the foot used in FIG. 3a, FIGS. 4a and 4b illustrate a group of cubes as seen from above and from below, respectively, FIG. 5 shows, diagrammatically, a method of using the cubes in the first stages of the cultivation of the seedlings, FIG. 6 shows the use of the cubes on cultivation slabs, FIG. 7 is a crosswise sectional view showing the cube/slab assembly method.

DESCRIPTION OF THE PREFERRED EMBODIMENTS

The "cube" represented has a standard shape for glass wool or mineral wool substrates. Its dimensions, by way of illustration, are, for example, a square base 120×120 mm and having a height of 75 mm.

At its upper part, the cube generally comprises a cavity to receive either a seed previously germinated on a support whose shape corresponds to that of the cavity, or a seed directly. In the largest operations, it is normal to proceed with the germination separately, which again makes possible a gain of space and improves the profitability of the installations by reducing the time the available surfaces are utilized.

The cube is ordinarily coated with a waterproof film on its lateral faces. This film has as its object to reduce the surface of the substrate exposed to the ambient air in the final stages of cultivation when the cubes are separated from one another (including when they are placed on the cultivation slabs as will be indicated below in connection with FIG. 6). By reducing the exposure to the ambient air, the evaporation and the drying risks of the substrate and the necessity of making the successive feedings of solution closer are limited.

FIGS. 2a and 2b show, in perspective, a cube according to the invention. It is a cube of standard shape but comprising on its lower face added feet on which the cube rests.

In the shape represented, the foot consists of a wire that is sufficiently rigid to support the weight of the cube even when it is soaked. The wire is, for example, a metal wire member coated with a protective material to prevent it from oxidizing.

The shape represented in detail in FIG. 3b shows a tapered part (4) intended to penetrate into the felt of fibers. If necessary, as represented, end (5) of the tapered part forms a harpoon or hook so that once embedded in the mass of felt, it remains fixed in position.

In the embodiment represented, a single element simultaneously forms two feet. The same suitably shaped rigid wire exhibits two ends tapered in a pin or harpoon. The middle part (6) serves as a means for stopping the penetrate into the felt. When this middle part strikes against the felt, even if the felt can be slightly deformed by the pressure exerted by this middle part, its elongation parallel to the felt prevents its penetration, the support surface being too large.

In this connection, the material of the cubes, whether being glass fibers or mineral fibers, are selected to be sufficiently "rigid" so that they do not deform appreciably under the effect of their own weight, even when they are soaked with irrigation solution. This is obtained by selecting felts whose density is sufficient on the one hand and whose structure reinforces the rigidity.

In particular, the dominant orientation of the fibers can be selected s as to improve resistance to crushing. It is possible also to make these felts stronger by more homogeneous tangling of the fibers. Also, it is possible, to a certain extent, to select the dimensions of the fibers (diameter, length) according to known principles to determine the mechanical characteristics in the isolation applications of this type of felt.

The feet (7) consist of loops formed in the wire itself. Their shape can be more or less flared. It is preferable not to make them too sharp if they must rest on a waterproof film that channels the irrigation solution. Further, as we will see below, it is useful that the foot itself can, in a certain way, act as a pin.

When the cubes in the final stages of cultivation are placed on the slabs, it is necessary that these feet do not constitute an obstacle to using the cube so that there is a continuous contact between the lower face of the cube and the upper face of the slab. FIG. 7 shows this arrangement in section. To simplify handling, it is preferable not to have to pull the foot out before placing the cube on the slab. When the foot does not exhibit too large a surface, and considering the fact that the resistance offered to penetration b the fibers constituting the slab is relatively limited, a moderate pressure makes it possible to cause the feet (7) to enter the slab without damaging it Further, the use of feet as has just been shown and described exhibits another advantage. During cultivation of the seedlings, fastening to a trellis is a very frequent operation, for example in the cultivation of tomatoes. To obtain this fastening, moderate pulls on the seedling are performed to bring it toward the trellis. When this operation is performed relatively so after placing of the cube on the slab and when the roots that go from one to the other are not very developed, the cube can have a tendency to tilt, thus breaking the cube-slab contact which is necessary for good development of the roots. The presence of the feet (7) which are sunk into the felt of the slab, as represented in FIG. 7, makes possible a better bonding of these two substrates and resists movement of one relative to the other.

The height h of the feet is selected to make drainage indeed possible, i.e., as we have seen, and the lower face of the cube must be kept at a position so that the irrigation solution cannot be held between the cube and the ground. A few millimeters suffice for this purpose. It is also preferable, in order to prevent the roots from growing outside the cube, that aeration be sufficient and, therefore, the height also. In practice, this height is preferably selected between 5 and 20 mm.

When the height is sufficient, it is found that besides the fact that a sufficient draining is obtained, the roots develop better than in cubes of standard shape. In practice, the roots which tend preferably to reach the base of the cube are stopped in their progression by contact with the air. Lateral branchings are then created that promote a more complete colonization of the mass of the cube and a better use of it.

FIG. 3a exhibits another embodiment of the invention in which the feet consist of a sort of a pin (8) whose structure is detailed in FIG. 3b and 3c.

The pin (8) comprises a tapered part (9) whose end is preferably in harpoon shape (10) so as to immobilize it in the felt of the cube. A stop collar (11) limits penetration into the cube. Foot (12) itself is preferably sufficiently tapered to penetrate into the material of a substrate with a structure similar to that of the cube. In this manner, as has been demonstrated, the cube is conveniently fastened to the slab.

The pin (8) is, for example, of a sufficiently rigid macromolecular material, for example, polystyrene or polyvinyl chloride.

In the examples presented, it is advantageous to place the feet at the time the cubes are manufactured to minimize handling by the user.

The cubes, for reasons of convenience, are normally marketed by rows made of several cubes gathered together, as shown in FIG. 4. The cubes are then generally joined to one another by adhesive lateral bands which, later, can be removed or cut to individualize the cubes. The adhesive bands, in this case, are applied to the waterproof film that surrounds the lateral faces of the cube.

In storage and packaging, the rows of cubes are superposed in several thicknesses. The presence of the feet on the cubes does not interfere with this method of assembly to the extent that, as we have specified, the space of the foot is selected so that with simple pressure it can penetrate into a felt similar to the one that makes up the cube.

In this packaging, the advantage that there is in providing the part that penetrates into the cube in the shape of a harpoon or hook is also understood. Actually, when two rows of cubes are separated, it is necessary to hold tapered part (4, 9) well in place in the cube, while the removal of the foot from the cube placed underneath necessarily exerts a pull which, although moderate, could result in the foot being pulled out of its position.

FIG. 5 represents, in section, a container for the cultivation of seedlings. Two successive stages of cultivation are shown there. In the first stage, represented in the left part, rows of cubes such as those of FIG. 4 are placed contiguously on the bottom of the irrigation container. In the second stage, represented on the right, the cubes are disconnected and separated from one another.

In this second stage of cultivation, the subirrigation of the standard cubes can result in their movement during the subirrigation operations. Actually, especially if the ground is not perfectly horizontal which can be preferred to improve drainage, the cubes can slide on the liquid film. The absence of this film according to the invention removes any danger of movement of the seedlings and, therefore, the necessity of manually restoring a temporarily compromised distribution.

FIG. 6 shows the last stage of cultivation. The cubes are placed on the bulkiest slabs. Ordinarily, these slabs are also coated with a waterproof film which limits losses by evaporation. The film in question provides, at the upper part, openings corresponding to positions of the cubes.

As previously indicated, it is important to provide good contact between the cube and the slab. It is obtained automatically when the base of the cubes is perfectly plane whereas it cannot be complete with cubes exhibiting grooves.

The use of the cubes according to the present invention provides a complete contact of the two cultivation substrates and, in addition, the use of the feet, as we have seen, makes possible a better bonding of the cubes and the slabs.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A substrate for the cultivation of seedlings, which comprises a substrate member having a felt portion and being of a substantially parallelepipedic shape, and having a plurality of feet extending from a lower face thereof, each of said feet having a tapered part so as to be embedded into said felt portion of the substrate member, and means for stopping penetration of said feet into said felt portion.

2. A substrate according to claim 1, wherein a height dimension of said feet is between 5 and 15 mm.

3. A substrate according to claim 1, wherein said tapered part comprises a hook member.

4. A substrate according to claim 1, wherein said feet each comprise a rigid wire having first and second ends that are positioned in said felt portion and a middle part on which the substrate rests wherein said middle part comprises said means for stopping penetration, first and second bent parts being connected to the tapered parts and wherein said bent parts comprise said feet.

5. A substrate according to claim 4, wherein said tapered parts each comprise a harpoon member.

6. A substrate according to claim 1, wherein at least one of said feet comprise a pin member which, includes a tapered part, a foot, and a stop collar interconnecting said tapered part and said foot.

7. A substrate according to claim 6, which comprises a harpoon member positioned at an end portion of said tapered part of the foot.

* * * * *